United States Patent [19]
Duffy

[11] Patent Number: 4,597,608
[45] Date of Patent: Jul. 1, 1986

[54] AUTOMOBILE WINDSHIELD COVER

[76] Inventor: LaVern N. Duffy, 3723 Cadillac Dr., Waterloo, Iowa 50701

[21] Appl. No.: 762,436

[22] Filed: Aug. 5, 1985

[51] Int. Cl.⁴ .............................................. B60J 1/20
[52] U.S. Cl. ................................ 296/95 C; 160/368 R
[58] Field of Search ............... 296/95 C, 95 R, 136; 160/368

[56] References Cited

U.S. PATENT DOCUMENTS

| 2,599,066 | 6/1952 | Osborn | 296/95 C |
| 2,614,630 | 10/1952 | Moszelt | 296/95 C |
| 3,588,169 | 6/1971 | Lunt | 296/95 C |
| 4,049,036 | 9/1977 | Gebhart | 296/95 C |

FOREIGN PATENT DOCUMENTS 674216 11/1963 Canada ........................... 296/95 C Primary Examiner—Robert R. Song
Attorney, Agent, or Firm—G. Brian Pingel; Kent A. Herink

[57] ABSTRACT

An improved automobile windshield cover to prevent frost, ice or snow from freezing on a windshield, includes a shield portion formed of an elongated strip of pliable material, with at least one resilient strap on each end for attaching the shield portion to the automobile. The cover straps are adapted to be clamped between the front doors and body of the automobile. One of the end straps is semi-permanently attached to the shield portion so that the strap can first be clamped between one of the front doors and the automobile's body and then attached to its associated cover end to pull the cover tauntly over the windshield.

5 Claims, 5 Drawing Figures

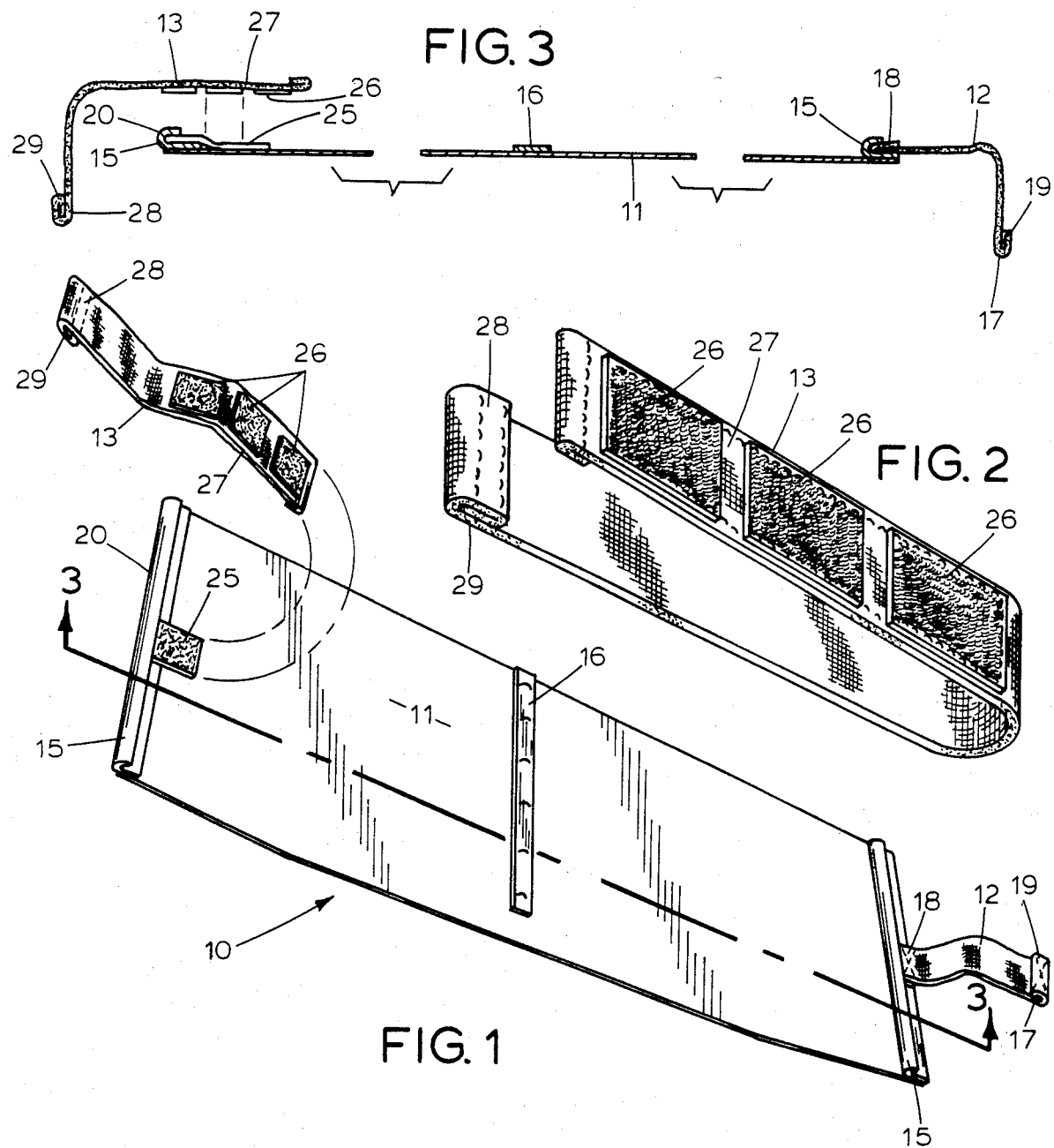

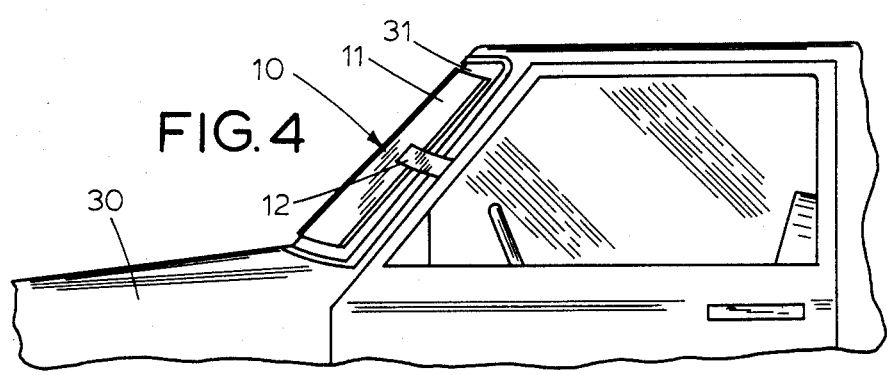
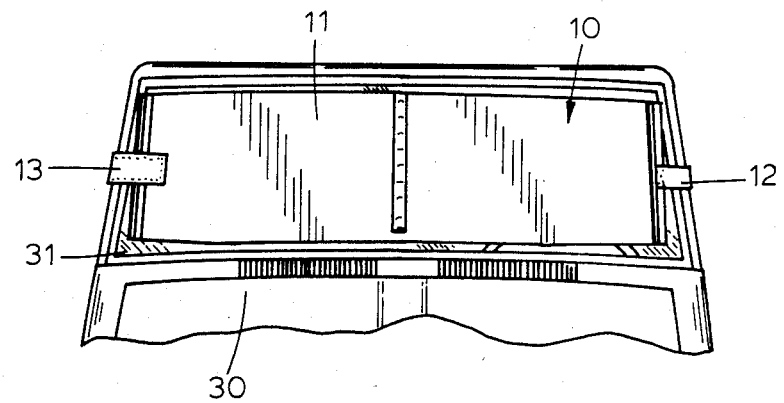

4,597,608

AUTOMOBILE WINDSHIELD COVER

BACKGROUND OF THE INVENTION

1. Field of the Invention

The present invention relates to devices for avoiding the accumulation of frost, ice or snow on automobile windshields, and more specifically relates to windshield covers adapted to be semi-permanently attachable to an automobile.

2. Description of the Prior Art

In the past, various devices have been employed to avoid the accumulation of ice or snow frozen on windshields of automobiles. Specifically, at least two types of attachable covers have been used to serve as a shield for the windshield while the car is in a parked position. One of these prior types of covers included elastic straps having U-shaped hooks attachable to the body of the automobile. Another of these prior art covers is utilized in association with magnetic strips that magnetically clamp the cover to the automobile body.

Both of the above prior art devices suffer from two major deficiencies. Firstly, they are totally accessible to persons that may desire to steal them and therefore, are highly subject to theft. Secondly, and more importantly, neither of these devices can be installed in rapid fashion to fit tauntly on the windshield with little effort or thought to their installation. The present invention overcomes the deficiencies of prior art devices by providing an improved windshield cover that can be quickly and conveniently installed to fit snugly on a windshield and is semi-permanently held in place unless the car doors of the automobile on which it is installed are opened.

SUMMARY OF THE INVENTION

The present invention provides an improved automobile windshield cover to prevent frost, ice or snow from freezing on the windshield of an automobile on which it is used while the automobile is in a parked position. The windshield cover includes a shield portion formed of an elongated strip of pliable material sized to substantially cover all of the windshield, and at least one thin strap associated with each end of the shield portion. Preferably, one or both of the straps is formed of a resilient material, and at least one of the straps is removably fixed to the shield portion by attachment means on the strap and such portion. The straps are each adapted to extend between one of the doors of the automobile and the body thereof to be clamped therebetween when the door is shut.

Preferably, the cover includes flexible support struts attached in transverse fashion to each end and a medial section of the shield portion to retain it in a substantially flat condition as it is being installed and when it lays in position on the windshield. The attachment means for the removable strap is preferably formed from "Velcro" in order to provide a rapid and efficient means for semi-permanently attaching such strap to the shield portion. Furthermore, the medial section of the shield portion is formed wider than the ends thereof and the shield portion is tapered in width from the medial section to the ends to better accommodate the curved configuration of most windshields.

The invention will appear more clearly from the following detailed description when taken in conjunction with the accompanying drawings, showing by way of example, a preferred embodiment of the inventive idea wherein like numerals refer to like parts throughout.

BRIEF DESCRIPTION OF THE DRAWINGS

FIG. 1 is a reduced perspective view of a preferred embodiment of the improved windshield cover of the present invention that is formed from a shield portion having two associated end straps;

FIG. 2 is a perspective view of one of the straps of FIG. 1 that is removably attachable to the shield portion;

FIG. 3 is a cross section taken on the line 3—3 of FIG. 1;

FIG. 4 is a reduced side view of an automobile showing the cover of FIG. 1 installed on the windshield thereof; and FIG. 5 is a reduced front view of an automobile showing the cover of FIG. 1 installed on the windshield thereof.

DETAILED DESCRIPTION OF THE INVENTION

Turning now to the drawings and with reference first to FIG. 1, an improved automobile windshield cover of the present invention is shown generally at 10. The cover is designed to be employed with an automobile in a parked condition to prevent accumulation of frost, ice or snow from freezing on the windshield thereof. The cover 10 is formed from a shield portion 11 and associated attachment straps 12 and 13 on opposite ends of the shield portion 11.

The shield portion 11 is formed of an elongated strip of pliable material such as preferably polyethylene or light fabric sized to substantially cover all of the windshield of the automobile with which the cover 10 is to be used. Preferably, included as part of the shield portion 11 are flexible support struts 15 and 16 attached to the upper side of the shield portion 11, with the support struts 15 at each end of the shield portion 11 and the support strut 16 attached to the center of the shield portion 11. The support struts 15 and 16 are positioned on the shield portion 11 transverse to the longitudinal axis thereof to assist in holding the shield portion 11 in a generally flat condition so that the cover 10 can be readily and conveniently installed on an automobile and drawn tauntly about the windshield.

The attachment strap 12 has a free end 17 and an opposite end 18 fixed to a medial portion of one side edge of the shield portion 11. Preferably, the strap 12 is formed from a thin, resilient material doubled over at the free end 17 to form a lengthwise node 19 on such free end for a purpose to be described below.

The strap 13 is semi-permanently attachable to a medial portion of an opposite side edge 20 of the shield portion 11. Various types of attachment means can be utilized for the semi-permanent attachment of the strap 13 to the side edge 20, but preferably, "Velcro" is used to form such attachment means. The term "Velcro" is well known in the art as a trademark for a nylon material made with both a surface of tiny hooks and a complimentary surface of an adhesive pile used in matching strips that can be pressed together or pulled apart for easy fastening and unfastening. Thus, a patch 25 of the tiny hooked "Velcro" material or the adhesive pile is attached to a medial portion of the side edge 20 adjacent the associated support strut 15 and complimentary patches of "Velcro" material 26 are attached to one end 27 of the attachable strap 13.

Similar to the strap 12, the strap 13 is formed from a thin material that is also preferably resilient and is doubled over at an end 28 to form a lengthwise node 29 for a purpose to be described below. Although it has been described that the straps 12 and 13 preferably are both formed from a resilient material, it is not absolutely essential that both straps 12 and 13 be resilient, but at least one of the straps 12 or 13 must have resilient properties. Preferably, the degree of resilience thereof should be low so that they are not easily stretchable.

Referring now to FIGS. 4 and 5, the cover 10 is shown in association with a portion of an automobile 30 with the cover 10 positioned on a windshield 31 of the automobile. To adapt the cover 10 to the normal curvature that most present day automobile windshields have, the shield portion 11 does not have a uniform width. Instead, the medial portion of the shield portion 11 is of a greater width than the end portions thereof. Preferably, the medial portion of the shield portion 11 should be approximately 14 inches wide and the end portions should be of a width of approximately 12 inches, with the shield portion 11 being tapered from its medial portion to its end portions. To provide added coverage of the windshield 31 by the cover 10, the taper of the portion 11 is provided by the bottom edge of the shield portion 11 having a slight convex curvature.

To attach the cover 10 to the automobile 30 as shown in FIGS. 4 and 5, is a relatively simplistic and rapid operation. First the driver side door is partially opened and the strap 12 is positioned between the driver side door and the body of the automobile 30. The door is then closed to clamp the strap 12 between the door and the automobile body. Thus, the strap 12 must be sufficiently thin so that it does not inhibit the closing of the automobile door and, in fact, should be thin enough that the strap can be pulled to move the lengthwise node 19 on the strap end 17 into a position to abut against the door. Thus, the node 19 prevents the strap 12 from being removed from its clamped position between the automobile door and body so long as the door remains closed.

Next, the strap 13 is detached from the shield portion 11 and is inserted between the automobile body and the passenger side door while such door is partially open. The strap 13 should be positoned so that its node and 28 will not be trapped between the door and body when the door is shut, but instead will be inside of the automobile 30 at such time. Then, the door is shut and the strap 13 is pulled until the node 19 lies adjacent the innerface of the door and body to prevent the strap 13 from being withdrawn therefrom.

With the strap 13 attached to the automobile 30, the shield portion 11 is grasped by the side edge 20 and is pulled tauntly against the windshield 31. Simultaneously, the strap 13 is grasped by its end 27 and is pulled with sufficient force to cause it to be partially stretched and it is then attached to the shield portion 11 by the "Velcro" patches 25 and 26. In this way, both of the straps 12 and 13 are in a slightly stretched condition after the strap 13 is attached to the shield portion 11 and thereby exert a tightening pressure on the shield portion 11 to hold it in a taunt condition against the surface of the windshield.

As should be recognized, the above installation procedure is extremely easy to accomplish and can be done rapidly and with no installaltion instruments needed.

Furthermore, once the installation is completed and the automobile doors are locked, the cover 10 is secured on the automobile 30 and cannot be removed therefrom without reopening its doors. In this way, the cover 10 is relatively immune from theft because it cannot be stolen without being damaged so badly as to be inoperable.

I claim:

1. An improved automobile windshield cover to prevent frost, ice or snow from freezing on a windshield, said cover comprising:
    (a) a shield portion formed by an elongated strip of pliable material sized to substantially cover all of said windshield;
    (b) at least one strap fixed to one of said shield portion, said strap having a node on its free end and being of a length sufficient to extend between one of the passenger or driver side front doors and the body of said automobile such that when said door is shut said strap is clamped between said door and said body and said node serves as a retaining abutment to prevent the strap from being removed therefrom;
    (c) at least one strap attachable to an opposite end of said shield portion and having means on one end for attachment to said shield portion and a node of its opposite end;
    (d) at least one of said fixed and attachable straps is formed from a resilient material;
    (e) means on said opposite end of said shield portion for cooperating with said attachment means on said attachable strap to semi-permanently fix said one end of said attachable strap to said opposite end of said shield portion; and
    (f) said attachable strap being adapted to extend between the other of said passenger or driver side front door and the body of said automobile and be clamped therebetween when said door is shut, and be retained in such position by said node to prevent said attachable strap from being removed therefrom, said strap being of sufficient length that when said opposite end is retained in position by said node, said one end of said strap is attachable to said opposite end of said shield portion in such fashion that said resilient strap is in a partially sretched condition to urge said shield portion to lie tauntly against said windshield.

2. An improved windshield cover as recited in claim 1 wherein said cover further includes a flexible support strut attached transversely to each end of said shield portion to retain said ends in a substantially flat condition when said cover is on said windshield.

3. An improved windshield cover as recited in claim 2 wherein said cover further includes a flexible support strut attached in transverse fashion to a medial section of said shield portion to retain said medial section in a substantially flat condition when said cover is on said windshield.

4. An improved windshield cover as recited in claim 1 wherein said attachment means on said opposite ends of said shield portion and said attachable strap are formed from "Velcro."

5. An improved windshield cover as recited in claim 1 wherein the medial section of said shield portion is wider than the ends thereof and said portion is tapered in width from said medial portion to said ends to accommodate the configuration of said windshield.

* * * * *